United States Patent
Lee et al.

(10) Patent No.: US 11,732,135 B2
(45) Date of Patent: Aug. 22, 2023

(54) PHOTOCURABLE SILICONE COMPOSITION

(71) Applicant: DOW SILICONES CORPORATION, Midland, MI (US)

(72) Inventors: Gyuyoung Lee, Chungcheongbuk-do (KR); Juyoung Yook, Chungcheongbuk-do (KR)

(73) Assignee: DOW SILICONES CORPORATION, Midland, MI (US)

( * ) Notice: Subject to any disclaimer, the term of this patent is extended or adjusted under 35 U.S.C. 154(b) by 331 days.

(21) Appl. No.: 17/104,187

(22) Filed: Nov. 25, 2020

(65) Prior Publication Data

US 2021/0163743 A1 Jun. 3, 2021

Related U.S. Application Data

(60) Provisional application No. 62/941,745, filed on Nov. 28, 2019.

(51) Int. Cl.
| | |
|---|---|
| *C08F 2/46* | (2006.01) |
| *C08F 2/50* | (2006.01) |
| *C08G 61/04* | (2006.01) |
| *C08L 83/04* | (2006.01) |
| *C08G 77/20* | (2006.01) |
| *C08G 77/28* | (2006.01) |
| *C08K 5/00* | (2006.01) |
| *C08J 3/24* | (2006.01) |
| *C08K 3/36* | (2006.01) |

(52) U.S. Cl.
CPC .............. *C08L 83/04* (2013.01); *C08G 77/20* (2013.01); *C08G 77/28* (2013.01); *C08J 3/248* (2013.01); *C08K 3/36* (2013.01); *C08K 5/0041* (2013.01); *C08K 2201/006* (2013.01); *C08L 2205/02* (2013.01); *C08L 2312/06* (2013.01)

(58) Field of Classification Search
CPC .......... C08K 5/0041; C08K 5/07; C08K 3/36; C08K 2201/006; C08G 77/28; C08G 77/20; C08L 83/04; C08L 83/08; C08L 83/00; C08L 2312/06; C08L 2205/02
USPC ........... 522/69, 68, 6, 189, 184, 71, 1; 520/1
See application file for complete search history.

(56) References Cited

U.S. PATENT DOCUMENTS

| | | | |
|---|---|---|---|
| 5,302,627 A | 4/1994 | Field et al. | |
| 7,691,557 B2 | 4/2010 | Bachmann et al. | |
| 8,593,633 B2 | 11/2013 | Nakajima et al. | |
| 8,652,996 B2 | 2/2014 | Kwan | |
| 2009/0136872 A1 | 5/2009 | Yoon et al. | |
| 2013/0240804 A1 | 9/2013 | Pagba et al. | |
| 2020/0032111 A1* | 1/2020 | Ogawa | C09J 7/38 |

FOREIGN PATENT DOCUMENTS

| | | | | |
|---|---|---|---|---|
| CN | 103642448 A | 3/2014 | | |
| WO | WO-2016116470 A1 * | 7/2016 | ............... | B60C 1/00 |
| WO | WO-2018066379 A1 * | 4/2018 | ............. | C08G 77/20 |

OTHER PUBLICATIONS

Allonas et al., WO 2016166470 Machine Translation, Oct. 20, 2016 (Year: 2016).*
Machine assisted English translation of CN103642448 obtained from https://patents.google.com/patent on Feb. 14, 2023, 8 pages.

* cited by examiner

*Primary Examiner* — Jessica Whiteley
(74) *Attorney, Agent, or Firm* — Warner Norcross + Judd LLP

(57) ABSTRACT

A photocurable silicone composition is disclosed. The composition comprises 4,5,6,7-tetrachloro-3',6'-dihydroxy-2',4',5',7'-tetraiodospiro[2-benzofuran-3,9'-xanthen]-1-one as a photochromic pigment. The photochromic pigment is present in an amount of from about 0.001 to about 0.05 mass % of a total amount of the composition. The composition can indicate a cure point thereof by disappearance of color.

8 Claims, No Drawings

PHOTOCURABLE SILICONE COMPOSITION

CROSS-REFERENCE TO RELATED APPLICATIONS

This application claims priority to and all advantages of U.S. Patent Application No. 62/941,745 FILED ON 28 Nov. 2019, the content of which is incorporated herein by reference.

TECHNICAL FIELD

The present invention relates to a photocurable silicone composition indicating a cure point thereof by disappearance of color.

BACKGROUND OF THE INVENTION

Photocurable silicone compositions are used for adhesives, encapsulants, coating agents, and the like of electric/electronic parts because they can be cured by irradiation with ultraviolet ("UV") light (or UV ray).

However, it is difficult to determine at what point the compositions are sufficiently cured. In many cases, the compositions may be under cured, so that dosage of UV light is too excessive to cure the composition. Excessive dosages may not harm cured products of the compositions, but it could damage the UV sensitive materials that could be adjacent to or nearby the composition in various application forms, and furthermore, using excessive dosages often require longer cure process time that cause lower overall productivity and a waste of resources. Therefore, it is desired that the photocurable silicone compositions may indicate sufficient curing condition without either under-curing or over-curing.

For example, U.S. Pat. No. 5,302,627 A discloses a method of indicating a cure point of a photocurable silicone composition, comprising: adding a non-cure inhibiting amount of a dye with a visible color to a photocurable silicone composition comprising a photoinitiator which generates free radicals upon exposure to ultraviolet radiation and at least one material which cures upon exposure to ultraviolet radiation; and thereafter exposing the resulting composition to a dosage of ultraviolet radiation which causes the visible color to either disappear or change to a different color indicating that cure has occurred coincidentally.

The photocurable silicone composition, however, substantially requires a colored composition, and may be changed to a different color to form a cured product. As a result, however, it becomes difficult to detect a cure point of the photocurable silicone composition.

Therefore, it is desired to develop a photocurable silicone composition with indication of a curing condition by disappearance of color, while it can be quickly cured by irradiation with UV light.

SUMMARY OF THE INVENTION

Technical Problem

An objective of the present invention is to provide a photocurable silicone composition that indicates curing condition by disappearance of color, while it can be quickly cured by irradiation with UV light.

Solution to Problem

The photocurable silicone composition of the present invention is characterized by containing 4,5,6,7-tetrachloro-3',6'-dihydroxy-2',4',5',7'-tetraiodospiro[2-benzofuran-3,9'-xanthen]-1-one as a photochromic pigment, in an amount of from about 0.001 to about 0.05 mass % of a total amount of the present composition.

The present composition is typically curable by an ene-thiol reaction, especially, it may comprise:
(A) an organopolysiloxane having at least two alkenyl groups with 2 to 12 carbon atoms per molecule;
(B) an organopolysiloxane having at least two mercaptoalkyl groups per molecule and/or an organic compound having at least two mercaptoalkyl groups per molecule, in an amount such that the mercaptoalkyl groups in component (B) is from about 0.2 to about 3 moles per 1 mole of the alkenyl groups in component (A);
(C) a photoinitiator, in an amount of from about 0.01 to about 2 mass % of the present composition; and
(D) 4,5,6,7-tetrachloro-3',6'-dihydroxy-2',4',5',7'-tetraiodospiro[2-benzofuran-3,9'-xanthen]-1-one as a photochromic pigment, in an amount of from about 0.001 to about 0.05 mass % of the present composition.

The present composition may further comprise: (E) a photostabilizer, in an amount of from about 0.01 to about 2 mass % of the present composition.

The present composition may further comprise: (F) an organopolysiloxane having neither an alkenyl group nor a mercaptoalkyl group, in an amount of from about 1 to about 50 mass % of the present composition.

The present composition may further comprise: (G) a filler, in an amount of from about 0.1 to about 15 mass % of the present composition.

Effects of Invention

The photocurable silicone composition of the present invention can indicate curing condition by disappearance of color, while it can be quickly cured by irradiation with UV light.

DETAILED DESCRIPTION OF THE INVENTION

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

<Photocurable Silicone Composition>

The photocurable silicone composition of the present invention is characterized by containing 4,5,6,7-tetrachloro-3',6'-dihydroxy-2',4',5',7'-tetraiodospiro[2-benzofuran-3,9'-xanthen]-1-one as a photochromic pigment.

The present composition permits a user of photocurable silicone compositions to be assured that the resulting material is fully cured. This is accomplished without overcuring by observation of disappearance of color. This disappearance of color occurs when an amount of from about 0.001 to about 0.05 mass %, optionally an amount of from about 0.005 to about 0.05 mass %, or optionally an amount of from about 0.01 to about 0.05 mass %, of the present composition. The disappearance of color can be from pink to translucent. This change usually lasts over long time periods and does not return upon standing. If the cure is not sufficiently complete, the original color will return upon standing over a period of time, such as from a few minutes, to an hour or more, to a couple of weeks. For purposes of this invention, the use of the term "photochromic pigment" means a pigment or a dye, more typically a dye, which will impart a color under ordinary visible light. Also, the changes are those which are observable in ordinary visible light.

The photochromic pigment useful in the present invention are those which, in the presence of free radical generating photoinitiators, changes color upon exposure to UV light. This change occurs and is essentially permanent at the point that a photocurable silicone composition is cured upon exposure to UV light.

The cure type of the present composition is not limited, but is exemplified by acryl type, ene-thiol type, onium salt type, or the like. It is thought that ene-thiol type photocurable silicone composition has good to excellent curability and/or good to excellent storage stability. The ene-thiol type photocurable silicone composition may comprise:

(E) an organopolysiloxane having at least two alkenyl groups with 2 to 12 carbon atoms per molecule;
(F) an organopolysiloxane having at least two mercaptoalkyl groups per molecule and/or an organic compound having at least two thiol groups per molecule;
(G) a photoinitiator; and
(H) 4,5,6,7-tetrachloro-3',6'-dihydroxy-2',4',5',7'-tetraiodospiro[2-benzofuran-3,9'-xanthen]-1-one as a photochromic pigment.

Component (A) is a base compound of the present composition and is an organopolysiloxane having at least two alkenyl groups 2 to 12 carbon atoms per molecule. Examples of the alkenyl groups include vinyl groups, allyl groups, butenyl groups, pentenyl groups, hexenyl groups, heptenyl groups, octenyl groups, nonenyl groups, decenyl groups, undecenyl groups, and dodecenyl groups. Among these, vinyl groups and hexenyl groups are preferred. The bond position of the alkenyl groups in component (A) is not restricted and can be bonded to the end of the molecule chain and/or to the silicon atom in the middle of the molecular chain.

Furthermore, examples of groups other than alkenyl groups in the molecule that are bonded to the silicon atom in component (A) include: alkyl groups with 1 to 12 carbon atoms such as methyl groups, ethyl groups, propyl groups, butyl groups, pentyl groups, heptyl groups, or the like; aryl groups with 6 to 12 carbon atoms such as phenyl groups, tolyl groups, xylyl groups, or the like; aralkyl groups with 7 to 12 carbon atoms such as benzyl groups, phenetyl groups, or the like; halogen substituted alkyl groups with 1 to 12 carbon atoms such as chloromethyl groups, 3-chloropropyl groups, 3,3-trifluoropropyl groups, or the like, and methyl groups and phenyl groups are preferable.

The state of component (A) at 25° C. is not limited, but it is preferably a liquid. The viscosity at 25° C. of component (A) is not limited; however, the viscosity is preferably in a range of 100 to 1,000,000 mPa·s. Note that in the present specification, viscosity is the value measured using a type B viscometer according to ASTM D 1084 at 23±2° C.

Component (B) is a curing agent of the present composition and is an organopolysiloxane having at least two mercaptoalkyl groups per molecule and/or a organic compound having at least two thiol groups per molecule. Component (B) is not limited as long as the component has sufficient solubility in component (A).

The organopolysiloxane for component (B) has at least two mercaptoalkyl groups per molecule. Examples of the mercaptoalkyl groups include 3-mercaptopropyl groups, 4-mercaptobutyl groups, 5-mercaptopentyl groups, and 6-mercaptohexyl groups. Among these, 3-mercaptopropyl groups are preferred.

Examples of silicon atom-bonded groups other than the mercaptoalkyl groups in component (B) include alkyl groups with 1 to 12 carbon atoms such as methyl groups, ethyl groups, propyl groups, isopropyl groups, butyl groups, pentyl groups, hexyl groups, heptyl groups, octyl groups, nonyl groups, decyl groups, undecyl groups, and dodecyl groups; aryl groups with 6 to 12 carbon atoms such as phenyl groups, tolyl groups, xylyl groups, naphthyl groups, and biphenyl groups; aralkyl groups with 7 to 12 carbon atoms such as benzyl groups and phenethyl groups. Among these, methyl groups and phenyl groups are preferred.

The state of component (B) at 25° C. is not limited, but it is preferably a liquid. The viscosity at 25° C. of component (B) is not limited; however, the viscosity is preferably in a range of 5 to 1,000,000 mPa·s. Note that in the present specification, viscosity is the value measured using a type B viscometer according to ASTM D 1084 at 23±2° C.

Examples of such organic compound for component (B) include o-, m-, or p-xylenedithiol, ethyleneglycol bisthioglycolate, butanediol bisthioglycolate, hexanediol bisthioglycolate, ethyleneglycol bis(3-thiopropionate), butanediol bis(3-thiopropionate), trimethylolpropane tris(3-thiopropionate), pentaerythritol tetrakis(3-thiopropionate), trihydroxyethyl triisocyanuric acid tris(3-thiopropionate), and organopolysiloxanes substituted with a mercapto group.

The content of component (B) is an amount that the amount of the thiol groups provided by the present component is in a range of from about 0.2 to about 2.0 moles, or optionally in a range of from about 0.3 to about 1.6 moles, per 1 mole of the total alkenyl groups in component (A). This is because, when the content of component (B) is within the range described above, mechanical strength of the resulting cured product increases.

Component (C) is a photoinitiator to enhance photo-cure of the composition. Component (C) may be selected from any known free radical type photoinitiator effective for promoting crosslinking reactions. Examples of component (C) include benzophenone, acetonaphthone, acetophenone, benzoin methyl ether, benzoin ethyl ether, benzoin isopropyl ether, benzoin isobutyl ether, 2-hydroxy-2-methylpropiophenone, 1-hydroxycyclohexylphenyl ketone, 2,2-diethoxyacetophenone, 3-hydroxypropylphenyl ketone, 3-hydroxypropyl-p-isopropylphenyl ketone, diethoxyxanthone, chloro-thioxanthone, azo-bisisobutyronitrile, N-methyl diethanolaminebenzophenone 4,4'-bis(dimethylamino)benzophenone, 2,2-dimethoxy-1,2-diphenylethan-1-one, 2-methyl-1-[4-(methylthio)phenyl]-2-morpholinopropan-1-one, 1-[4-(2-hydroxyethoxy)phenyl]-2-hydroxy-2-methylpropan-1-one, 2-benzyl-2-dimethylamino-1-(4-morpholinophenyl)butan-1-one, bis(2,4,6-trimethylbenzoyl) phenylphosphine oxide, and combinations thereof.

The content of component (C) is in a range of from about 0.01 to about 2 mass %, optionally in a range of from about 0.05 to about 2 mass %, or optionally in a range of from about 0.1 to about 1.5 mass % of the present composition. This is because, when the content of component (C) is within the range described above, curing efficiently proceeds to form a cured product having excellent heat resistance and light resistance.

Component (D) is 4,5,6,7-tetrachloro-3',6'-dihydroxy-2',4',5',7'-tetraiodospiro[2-benzofuran-3,9'-xanthen]-1-one as a photochromic pigment to indicate curing condition by disappearance of color without inhibiting curability of the present composition.

The content of component (D) is in an amount of from about 0.001 to about 0.05 mass %, optionally an amount of from about 0.005 to about 0.05 mass %, or optionally an amount of from about 0.01 to about 0.05 mass %, of the present composition. This is because, when the content of component (D) is within the range described above, the disappearance of color can be accelerated without inhibiting curability of the present composition.

The present composition comprises components (A) to (D) described above; however, to impart heat resistance to a cured product of the present composition, (E) a photostabilizer, and/or (F) an organopolysiloxane having neither an alkenyl group nor a mercaptoalkyl group, and/or (G) a filler is preferably contained.

Examples of such photostabilizer for component (E) include 2,6-bis(1,1-dimethylethyl)-4-methylphenol (BHT), pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, 2,4-dimethyl-6-(1-methylpentadecyl)phenol, diethyl[{3,5-bis(1,1-di-tert-butyl-4-hydroxyphenyl)methyl}phosphonate, 3 3',3",5,5', 5"-hexane-tert-butyl-4-a,a',a"-(mesitylene-2,4,6-tolyl)tri-p-cresol, 4,6-bis(octylthiomethyl)-o-cresol, ethylenebis (oxyethylene)bis[3-(5-tert-butyl-4-hydroxy-m-tolyl) propionate], and hexamethylene bis[3-(3,5-di-tert-butyl-4-hydroxyphenyl)propionate].

The content of component (E) is not limited; however, the content is preferably in a range of from about 0.001 to about 1 mass %, optionally in a range of from about 0.005 to about 0.5 mass %, or optionally in a range of from about 0.01 to about 0.1 mass %, of the present composition. This is because, when the content of component (E) is within the range described above, change in viscosity of the composition prior to the photocuring is small and a cured product having excellent heat resistance and light resistance is obtained.

Component (F) is an organopolysiloxane having neither an alkenyl group nor a mercaptoalkyl group. Examples of silicon atom-bonded groups in component (F) include alkyl groups with 1 to 12 carbon atoms such as methyl groups, ethyl groups, propyl groups, isopropyl groups, butyl groups, pentyl groups, hexyl groups, heptyl groups, octyl groups, nonyl groups, decyl groups, undecyl groups, and dodecyl groups; aryl groups with 6 to 12 carbon atoms such as phenyl groups, tolyl groups, xylyl groups, naphthyl groups, and biphenyl groups; aralkyl groups with 7 to 12 carbon atoms such as benzyl groups and phenethyl groups. Among these, methyl groups and phenyl groups are preferred.

The molecular structure of the organopolysiloxane for component (F) is not limited, but it is preferably a resinous organopolysiloxane comprising $R_3SiO_{1/2}$ siloxane units and $SiO_{4/2}$ siloxane units.

In the above formula, R represents a $C_{1-20}$ alkyl group. Examples of the alkyl groups include methyl groups, ethyl groups, propyl groups, butyl groups, pentyl groups, hexyl groups, heptyl groups, octyl groups, nonyl groups, decyl groups, undecyl groups, and dodecyl groups.

In component (F), it is desirable that the molar ratio of $R_3SiO_{1/2}$ siloxane units to $SiO_{4/2}$ siloxane units is in a range of from about 0.5 to about 1.2, optionally in a range of from about 0.6 to about 1.1, or optionally in a range of from about 0.7 to about 1.1. This is because, when the content of component (F) is within the range described above, a cured product having excellent mechanical properties is obtained.

The content of component (F) is not limited; however, the content is preferably in a range of from about 1 to about 50 mass %, optionally in a range of from about 5 to about 50 mass %, or optionally in a range of from about 10 to about 50 mass %, of the present composition. This is because, when the content of component (F) is within the range described above, a cured product having excellent mechanical properties is obtained.

Component (G) is a filler to enhance mechanical strength of a cured product. Examples of a filler for component (G) include one or more of finely divided treated or untreated precipitated or fumed silica; precipitated or ground calcium carbonate, zinc carbonate; clays such as finely divided kaolin; quartz powder; aluminum hydroxide; zirconium silicate; diatomaceous earth; wollastonite; pyrophylate; and metal oxides such as fumed or precipitated titanium dioxide, cerium oxide, magnesium oxide powder, zinc oxide, and iron oxide.

The content of component (G) is not limited; however, the content is preferably in a range of from about 0.1 to about 15 mass %, optionally in a range of from about 0.5 to about 15 mass %, or optionally in a range of from about 1 to about 15 mass %, of the present composition. This is because, when the content of component (G) is within the range described above, a cured product having excellent mechanical properties is obtained.

The present composition may further contain, as an optional component, to enhance storage stability in a light-shielded condition of the present composition, a radical scavenger other than component (E) is preferably contained. Examples of such radical scavenger include hindered amines, such as N,N',N'',N'''-tetrakis(4,6-bis(butyl-(N-methyl-2,2,6,6-tetramethylpiperidin-4-yl)amino)-triazin-2-yl)-4,7-diazadecane-1,10-diamine, bis(1,2,2,6,6-pentamethyl-4-piperidyl)[[3,5-bis(1,1-dimethylethyl)-4-hydroxyphenyl]methyl]butylmalonate, methyl-1,2,2,6,6-pentamethyl-4-piperidyl)sebacate, bis(2,2,6,6-tetramethyl-4-piperidyl)sebacate, bis(1,2,2,6,6-pentamethyl-4-piperidyl)sebacate, and 8-acetyl-3-dodecyl-7,7,9,9-tetramethyl-1,3,8-triazaspiro[4.5]decane-2,4-dione; quinones or phenols, such as methylhydroquinone, 1,4-naphthoquinone, 4-methoxynaphthol, tert-butylhydroquinone, benzoquinone, pyrogallol, and phenothiazine.

The content of the radical scavenger is not limited; however, the content is preferably in a range of from about 0.0001 to about 1 mass %, or optionally in a range of from about 0.0001 to about 0.1 mass % of the present composition. This is because, when the content is within the range described above, a cured product having excellent heat resistance and light resistance is obtained.

The present composition can be cured by irradiation of UV light. For example, low pressure, high pressure or ultrahigh pressure mercury lamp, metal halide lamp, (pulse) xenon lamp, or an electrodeless lamp is useful as an UV lamp. Irradiation dose is preferably in a range of from about 5 to about 6,000 mJ/cm$^2$, or optionally in a range of from about 10 to about 4,000 mJ/cm$^2$.

EXAMPLES

The photocurable silicone composition of the present invention will now be described in detail using Example. Note that, in the formulas, "Me", "Vi", and "Th" respectively indicates methyl group, vinyl group, and 3-mercaptopropyl group. Viscosity of organopolysiloxane was measured as follows.
<Viscosity>
Viscosity at 23±2° C. was measured by using a type B viscometer (Brookfield LVF Type Rotational Viscometer with using Spindle #2 at 60 rpm) according to ASTM D 1084 "Standard Test Methods for Viscosity of Adhesive".

Example 1

The following components were used to prepare a photocurable silicone composition (mass %) shown in Table 1. For the photocurable silicone composition, "SH/Vi" represents a molar ratio of the thiol groups in component (B) with respect to 1 mole of the vinyl groups in component (A).

The following organopolysiloxane was used as component (A).
(a1) a dimethylpolysiloxane with a viscosity of 2,000 mPa·s and represented by the following formula:

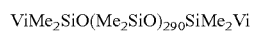
$ViMe_2SiO(Me_2SiO)_{290}SiMe_2Vi$

The following organopolysiloxane was used as component (B).
(b1) a copolymer of dimethysiloxane and methyl(3-mercaptopropyl)siloxane with a viscosity of 100 mPa·s and represented by the following average formula:

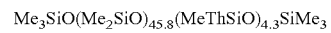
$Me_3SiO(Me_2SiO)_{45.8}(MeThSiO)_{4.3}SiMe_3$

The following photoinitiator was used as component (C).
(c1): 2-hydroxy-2-methylpropiophenone
The following photochromic pigment was used as component (D).
(d1): 4,5,6,7-tetrachloro-3',6'-dihydroxy-2',4',5',7'-tetraiodospiro[2-benzofuran-3,9'-xanthen]-1-one
The following photostabilizer was used as component (E).
(e1): 2,6-bis(1,1-dimethylethyl)-4-methylphenol
The following component was used as component (F).
(f1): an organopolysiloxane resin represented by the following average unit formula:

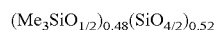
$(Me_3SiO_{1/2})_{0.48}(SiO_{4/2})_{0.52}$

The following component was used as component (G).
(g1): hydrophobic fumed silica with a BET specific surface area of 200 m$^2$/g
<Curing Process>
About 5-10 g of photocurable silicone composition was loaded into a 30 cc polyethylene cup. After leveling the surface level by centrifuging the composition, it goes through 395 nm UV lamps for 0.5-1 minute with a light intensity of 1000 mW/cm$^2$. The composition's color will change after the UV light exposure, which shows that the product had UV light exposure. This color change indicates that the product is cured, because UV curing lamps are the only source of UV light during the UV curing process.

The photocurable silicone composition was evaluated as follows. The properties of the photocurable silicone composition and cured product thereof are shown in Table 1.
<Appearance Before UV Radiation>
After the photocurable silicone composition was prepared, its appearance was visually observed.
<Appearance After UV Radiation>
After UV radiation, cured product was visually observed.

TABLE 1

|  |  | Example 1 |
|---|---|---|
| Photocurable silicone composition (mass %) | (a1) | 44.46 |
|  | (b1) | 1.03 |
|  | (c1) | 1.00 |
|  | (d1) | 0.02 |
|  | (e1) | 0.03 |
|  | (f1) | 44.46 |
|  | (g1) | 9 |
| SH/Vi |  | 0.30 |
| Appearance | Before UV radiation | Pink |
|  | After UV radiation | Translucent |

INDUSTRIAL APPLICABILITY

The photocurable silicone composition of the present invention can be cured by irradiation with UV light, and indicate a cure point thereof. Therefore, the present composition is useful as various adhesives, encapsulants, coating agents, and the like of electric/electronic parts.

What is claimed is:

1. A photocurable silicone composition, the composition comprising:
   4,5,6,7-tetrachloro-3',6'-dihydroxy-2',4',5',7'-tetraiodospiro[2-benzofuran-3,9'-xanthene]-1-one as a photochromic pigment, and present in an amount of from about 0.001 to about 0.05 mass % of a total amount of the composition; and
   a photoinitiator, which is different from the photochromic pigment;
   wherein the photochromic pigment imparts a color to the photocurable silicone composition; and
   wherein the photocurable silicone composition indicates a cure point thereof by disappearance of the color imparted by the photochromic pigment.

2. The photocurable silicone composition according to claim 1, being curable by an ene-thiol reaction.

3. The photocurable silicone composition according to claim 2, comprising:
   (A) an organopolysiloxane having at least two alkenyl groups with 2 to 12 carbon atoms per molecule;
   (B) an organopolysiloxane having at least two mercaptoalkyl groups per molecule and/or an organic compound having at least two mercaptoalkyl groups per molecule, in an amount such that the mercaptoalkyl groups in component (B) is from about 0.2 to about 3 moles per 1 mole of the alkenyl groups in component (A);
   (C) the photoinitiator, in an amount of from about 0.01 to about 2 mass % of the composition; and
   (D) the 4,5,6,7-tetrachloro-3',6'-dihydroxy-2',4',5',7'-tetraiodospiro[2-benzofuran-3,9'-xanthen]-1-one present in an amount of from about 0.001 to about 0.05 mass % of the composition.

4. The photocurable silicone composition according to claim 3, further comprising:
   (E) a photostabilizer, in an amount of from about 0.01 to about 2 mass % of the composition.

5. The photocurable silicone composition according to claim 3, further comprising:
   (F) an organopolysiloxane having neither an alkenyl group nor a mercaptoalkyl group, in an amount of from about 1 to about 50 mass % of the composition.

6. The photocurable silicone composition according to claim 3, further comprising:
   (G) a filler, in an amount of from about 0.1 to about 15 mass % of the composition.

7. The photocurable silicone composition according to claim 4, further comprising:
   (F) an organopolysiloxane having neither an alkenyl group nor a mercaptoalkyl group, in an amount of from about 1 to about 50 mass % of the composition.

8. The photocurable silicone composition according to claim 7, further comprising:
   (G) a filler, in an amount of from about 0.1 to about 15 mass % of the composition.

* * * * *